United States Patent
Kasody et al.

(10) Patent No.: US 12,428,154 B2
(45) Date of Patent: Sep. 30, 2025

(54) IN-FLIGHT VIRTUAL EXPERIENCES CORRESPONDING TO REAL-LIFE EXPERIENCES ENCOUNTERED ALONG PASSENGER JOURNEYS

(71) Applicant: Panasonic Avionics Corporation, Irvine, CA (US)

(72) Inventors: Robert Kasody, Costa Mesa, CA (US); Ali Asrani, Corinth, TX (US); Min-Hsuan Tang, Mission Viejo, CA (US); Joseph Kidd, Knoxville, TN (US); Tim Chen, Irvine, CA (US); Siew Sin Lim, Irvine, CA (US); Vinod Kapila, San Diego, CA (US)

(73) Assignee: Panasonic Avionics Corporation, Irvine, CA (US)

( * ) Notice: Subject to any disclaimer, the term of this patent is extended or adjusted under 35 U.S.C. 154(b) by 162 days.

(21) Appl. No.: 18/493,394

(22) Filed: Oct. 24, 2023

(65) Prior Publication Data
US 2024/0367795 A1 Nov. 7, 2024

Related U.S. Application Data

(60) Provisional application No. 63/499,889, filed on May 3, 2023.

(51) Int. Cl.
*B64D 11/00* (2006.01)
*G06F 3/01* (2006.01)
(Continued)

(52) U.S. Cl.
CPC .......... *B64D 11/0015* (2013.01); *G06F 3/011* (2013.01); *G06Q 10/025* (2013.01); *G06Q 50/01* (2013.01); *H04N 21/41422* (2013.01)

(58) Field of Classification Search
None
See application file for complete search history.

(56) References Cited

U.S. PATENT DOCUMENTS

2002/0154174 A1* 10/2002 Redlich ................. G06F 16/954
715/848
2009/0109223 A1* 4/2009 Schalla .............. B64D 11/0624
244/129.1
(Continued)

FOREIGN PATENT DOCUMENTS

CN 101687549 A 3/2010
EP 4459522 A1 11/2024
(Continued)

OTHER PUBLICATIONS

Williamson, Julie R., et al. "PlaneVR: Social Acceptability of Virtual Reality for Aeroplane Passengers", Proceedings of the 2019 CHI Conference on Human Factors in Computing Systems, May 2, 2019, pp. 1-14, Association for Computing Machinery, New York, NY, USA.

(Continued)

*Primary Examiner* — Linda Huynh
(74) *Attorney, Agent, or Firm* — Perkins Coie LLP

(57) ABSTRACT

Technical solutions are described that provide in-flight virtual experiences for passengers onboard a commercial passenger vehicle. In some examples, the in-flight virtual experiences simulate real-life experiences that relate to the respective travels or journeys of the passengers. For example, the in-flight virtual experiences can simulate, in various extended reality (XR) forms (e.g., virtual reality (VR), augmented reality (AR), mixed reality (MR)), tourism attractions at journey destinations, vendor goods and services, and the like. The in-flight virtual experiences are provided via virtual experience applications implemented by an in-vehicle system, and multiple passengers can interact (Continued)

and collaborate in a combined session for a virtual experience application. Passengers can use the virtual experience applications to control aspects of the in-flight virtual experiences, and further to pre-configure, pre-arrange, or reserve aspects of corresponding real-life virtual experiences while the passengers are still in transit.

20 Claims, 11 Drawing Sheets

(51) Int. Cl.
  G06Q 10/02 (2012.01)
  G06Q 50/00 (2024.01)
  H04N 21/414 (2011.01)

(56) References Cited

U.S. PATENT DOCUMENTS

| | | | | |
|---|---|---|---|---|
| 2009/0112377 | A1* | 4/2009 | Schalla | B64D 11/00 705/15 |
| 2018/0101225 | A1* | 4/2018 | Azmy | B60K 35/22 |
| 2019/0079298 | A1* | 3/2019 | Shoji | G02B 27/017 |
| 2019/0273964 | A1 | 9/2019 | Couleaud et al. | |
| 2019/0353485 | A1* | 11/2019 | Sink | G06Q 30/06 |
| 2021/0124466 | A1* | 4/2021 | Hoang | G06F 3/0482 |
| 2022/0224963 | A1 | 7/2022 | Herz et al. | |
| 2024/0144413 | A1* | 5/2024 | Ishii | G06Q 50/01 |
| 2024/0335738 | A1* | 10/2024 | Lake-Schaal | A63F 13/795 |

FOREIGN PATENT DOCUMENTS

| | | |
|---|---|---|
| EP | 4460056 A1 | 11/2024 |
| WO | 2016029224 A1 | 2/2016 |
| WO | 2023023381 A1 | 2/2023 |

OTHER PUBLICATIONS

Extended European Search Report issued in corresponding European Patent Application No. 24173028.2 mailed Oct. 2, 2024 (26 pages).

"Best Metaverse Examples in Real-Life, AR, and VR," Adcore Blog, retrieved from https://www.adcore.com/blog/what-are-metaverse-examples/ on Sep. 18, 2023.

Kupietzky, Joshua, "All Nippon Airways Will Launch an NFT Business," Simple Flying, Jun. 4, 2023, retrieved from https://simpleflying.com/all-nippon-airways-nft-business/ on Sep. 18, 2023.

Extended European Search Report from European Patent Application No. 24173036.5 mailed Jun. 17, 2024 (26 pages).

* cited by examiner

User inputs utilized in the combined interactive session, to pre-configure aspects (select Provider(s) based on Passenger Selected/Preselected Criteria (e.g., cost, convenience, familiarity, past reliability ...) ) for the Real-World Experience  X means selected and 0 means not selected

| Provider | 1 | 2 | 3 | ... | N | 1 | 2 | 3 | ... | N | 1 | 2 | 3 | ... | N | 1 | 2 | 3 | ... | N | 1 | 2 | 3 | ... | N |
|---|---|---|---|---|---|---|---|---|---|---|---|---|---|---|---|---|---|---|---|---|---|---|---|---|---|
| Activity 1 | 0 | X | 0 | ... | 0 | 0 | 0 | 0 | ... | 0 | 0 | 0 | 0 | ... | 0 | 0 | 0 | 0 | ... | 0 | 0 | 0 | 0 | ... | N |
| Activity 2 | 0 | 0 | X | ... | X | 0 | 0 | 0 | ... | X | 0 | 0 | 0 | ... | 0 | 0 | 0 | 0 | ... | 0 | 0 | 0 | 0 | ... | 0 |
| Activity 3 | 0 | 0 | 0 | ... | 0 | 0 | 0 | 0 | ... | X | 0 | 0 | 0 | ... | 0 | 0 | X | 0 | ... | 0 | 0 | 0 | X | ... | 0 |
| Activity 4 | 0 | X | 0 | ... | X | 0 | 0 | X | ... | 0 | 0 | X | 0 | ... | 0 | 0 | X | 0 | ... | 0 | 0 | 0 | 0 | ... | 0 |
| Activity 5 | 0 | 0 | 0 | ... | 0 | 0 | X | 0 | ... | 0 | 0 | 0 | 0 | ... | 0 | 0 | 0 | 0 | ... | 0 | 0 | 0 | 0 | ... | 0 |
| Activity 6 | X | 0 | 0 | ... | X | 0 | 0 | 0 | ... | X | X | 0 | 0 | ... | 0 | 0 | 0 | 0 | ... | 0 | 0 | 0 | 0 | ... | X |
| Activity 7 | 0 | 0 | 0 | ... | 0 | 0 | 0 | X | ... | 0 | 0 | 0 | 0 | ... | 0 | 0 | 0 | 0 | ... | 0 | 0 | 0 | 0 | ... | X |
| Activity 8 | 0 | X | 0 | ... | 0 | 0 | 0 | 0 | ... | 0 | 0 | 0 | 0 | ... | 0 | 0 | 0 | 0 | ... | 0 | 0 | 0 | X | ... | 0 |
| Activity 9 | 0 | 0 | 0 | ... | 0 | 0 | 0 | 0 | ... | 0 | 0 | 0 | 0 | ... | 0 | 0 | X | 0 | ... | 0 | 0 | 0 | 0 | ... | 0 |
| Activity N | 0 | 0 | 0 | ... | 0 | 0 | 0 | 0 | ... | 0 | 0 | 0 | 0 | ... | 0 | 0 | 0 | 1 | ... | 0 | 1 | 0 | 0 | ... | 1 |

FIG. 5D

Passenger Travel Plans created/proposed using select Provider(s)) for the Common Passenger Selected Real-World Experience(s)

| Travel Plan 1 | | | Start Date | End Date |
|---|---|---|---|---|
| Activity 1 | Provider 2 | Provider 2 | Day/YR | Day/YR |
| Activity 2 | Provider 3 | Provider N | Day/YR | Day/YR |
| Activity 5 | Provider 3 | Provider 1 | Day/YR | Day/YR |
| Activity 6 | Provider 1 | Provider N | Day/YR | Day/YR |
| Activity 8 | Provider 2 | Provider 3 | Day/YR | Day/YR |

| Travel Plan 2 | | | Start Date | End Date |
|---|---|---|---|---|
| Activity 3 | Provider 2 | Provider 3 | Day/YR | Day/YR |
| Activity 4 | Provider 2 | Provider 1 | Day/YR | Day/YR |
| Activity 6 | Provider 1 | Provider N | Day/YR | Day/YR |
| Activity N | Provider 3 | Provider N | Day/YR | Day/YR |

*FIG. 5E*

Passenger Travel Plans created/proposed using select Provider(s)) for Common Passengers Selected Real-World Experience(s)

| Travel Plan 3 | | | Start Date | End Date |
|---|---|---|---|---|
| Activity 2 | Provider 3 | Provider N | Day/YR | Day/YR |
| Activity 6 | Provider 1 | Provider N | Day/YR | Day/YR |
| Activity 8 | Provider 2 | Provider 3 | Day/YR | Day/YR |

| Travel Plan 4 | | Start Date | End Date |
|---|---|---|---|
| Activity 4 | Provider 2 | Day/YR | Day/YR |
| Activity 6 | Provider 1 | Day/YR | Day/YR |
| ... | | | |

| Travel Plan 5 | | | Start Date | End Date |
|---|---|---|---|---|
| Activity 6 | Provider 1 | Provider N | Provider 1 | Day/YR | Day/YR |
| ... | | | ... | Day/YR | Day/YR |

*FIG. 5F*

IN-FLIGHT VIRTUAL EXPERIENCES CORRESPONDING TO REAL-LIFE EXPERIENCES ENCOUNTERED ALONG PASSENGER JOURNEYS

CROSS-REFERENCE TO RELATED APPLICATIONS

This application claims priority to, and the benefit of, U.S. Provisional Application No. 63/499,889, titled PLATFORM FOR PASSENGER INTERACTION USING AUGMENTED/VIRTUAL REALITY TECHNOLOGY and filed on May 3, 2023. The aforementioned application is herein incorporated in its entirety, including any drawings and appendices.

TECHNICAL FIELD

The present disclosure is related to in-flight or in-vehicle entertainment systems, and the privacy and security of users thereof.

BACKGROUND

Commercial travel has evolved to provide entertainment options to passengers traveling to their destinations. For example, in an airplane or train, in-vehicle systems that include seatback monitors can provide entertainment options to passengers such that passengers can watch movies or television shows as they travel to their destinations. Passenger vehicles have also begun to provide connectivity tools that may provide additional opportunities to passengers for entertainment or productivity.

SUMMARY

The present disclosure generally relates to in-flight virtual experiences being provided to passengers onboard a commercial passenger vehicle. An in-vehicle system onboard a commercial passenger vehicle is configured with virtual experience applications that provide virtual experiences that relate to or simulate real-world experiences that relate to a journey of the commercial passenger vehicle and/or respective journeys of its passengers. The virtual experience applications can be operated within an in-flight shared virtual environment or in-flight metaverse in which passengers onboard the commercial passenger vehicle can interact, communicate, collaborate, and/or the like. Accordingly, passengers can interact and interface with a commercial passenger vehicle simultaneously and contemporaneously in combined interactive sessions. Examples of virtual experience applications provided in-flight allow passengers to interactively (and jointly, in some examples) pre-configure or pre-arrange aspects of real-world experiences at their destinations, explore and learn about real-world landmarks encountered in transit, communicate and collaborate with other passengers traveling to the same destinations, and/or the like.

These, and other aspects are disclosed throughout the present document.

BRIEF DESCRIPTION OF THE DRAWINGS

FIGS. 5D-5F illustrate examples of pre-configuring aspects of real-world experiences related to journeys of passengers onboard a commercial passenger vehicle.

DETAILED DESCRIPTION

General Overview and Example Technical Advantages

Figure 1:
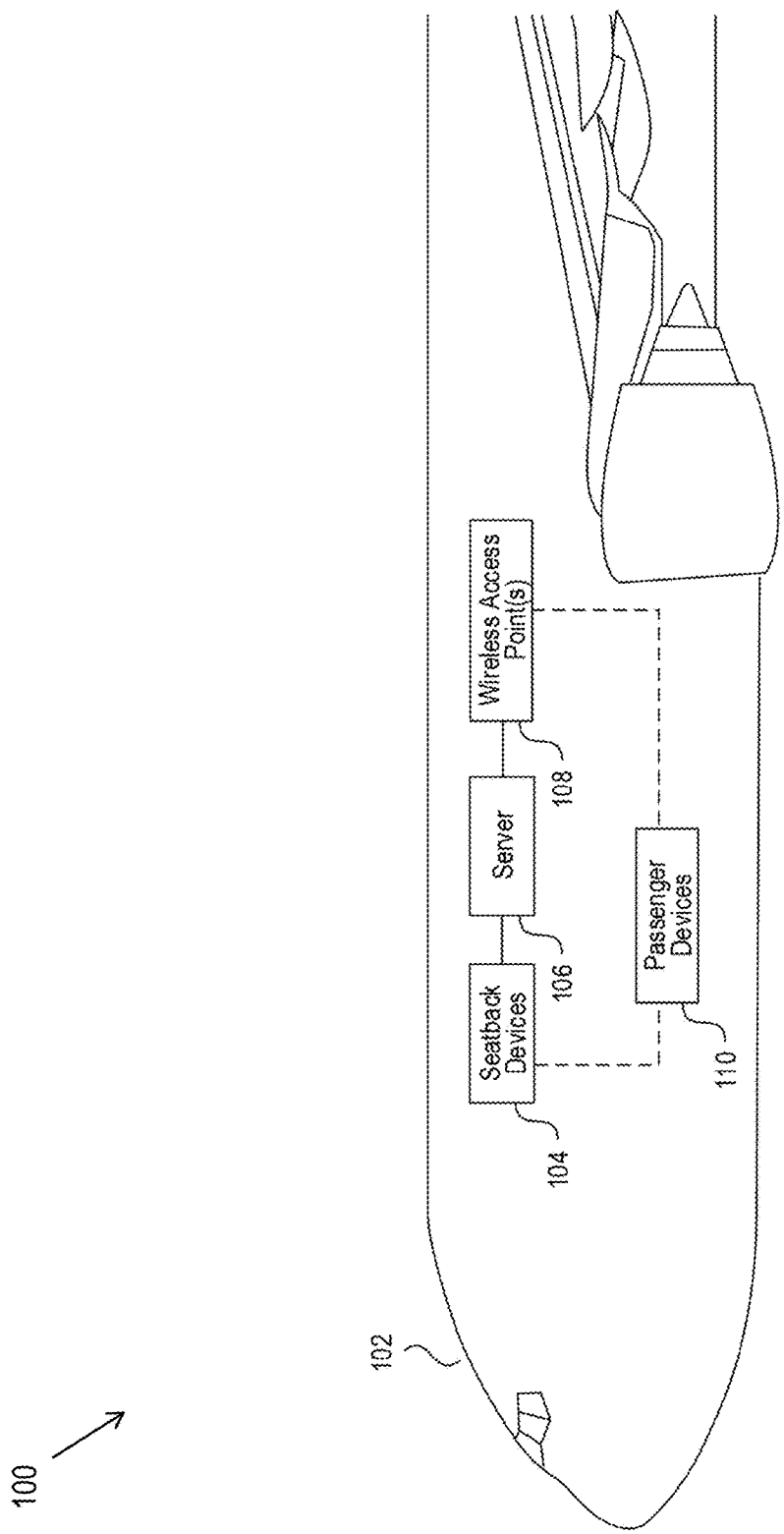
FIG. 1 is a block diagram of an example commercial passenger vehicle with an example system for providing an in-flight shared virtual environment for passengers onboard the commercial passenger vehicle.

Commercial passenger vehicles provide entertainment options and connectivity tools for passengers to consume and use during their journeys to their destinations. The present disclosure provides technical systems onboard commercial passenger vehicles that are configured to provide virtual experience content that is tied to the journeys of the passengers. While in transit onboard a commercial passenger vehicle, passengers can enjoy and be immersed in a virtual platform in which the passengers can collaboratively consume the virtual experience content and make decisions, selections, and arrangements with respect to virtual experience content to configure or arrange aspects of real-world travel experiences.

According to example embodiments, an in-vehicle system is configured with virtual experience applications configured to provide virtual content that relates to or simulates real-world experiences related to passenger journeys. The virtual experience applications can be virtual features provided in a virtual world, such as one provided via an in-flight shared virtual environment or in-flight metaverse. In doing so, an in-vehicle system can operate or execute a combined (e.g., multi-user) interactive session of a virtual experience application, such that two or more passengers can enjoy, interact with, and collaborate on the virtual content of the virtual experience application.

The virtual content provided by the virtual experience applications of an in-vehicle system are specific to respective journeys of the passengers onboard the commercial passenger vehicle and/or to the travel of the commercial passenger vehicle. In particular, the virtual content relates to or simulates real-world experiences related to passenger and/or vehicle journeys. In some examples, the real-world experiences include those provided or occurring at destinations of the passengers' journeys, and the passengers can interact with the virtual experience applications to preview these real-world experiences at their destinations, and further, to pre-configure or pre-arrange aspects of the real-world experiences during their travel to said destinations. For instance, passengers can immersively and virtually tour a museum located at their destination through a virtual experience application, and can further make selections or inputs (based on the virtual experience) to book a real-life tour or tickets for the museum while in-flight to the destination.

To do so, the in-vehicle system providing a virtual experience application can communicate user selections, inputs, and interactions within the virtual experience application to extra-vehicular systems associated with the real-world experience. These user selections, inputs, and interactions within the virtual experience application can specify the aspects of the real-world experience, and communication thereof to the extra-vehicular systems allows the real-world experience to pre-configure, pre-arrange, or fulfill the specified aspects while the passengers are in transit. In some embodiments, the in-vehicle system can store the user selections, inputs, and/or interactions to a central database, ledger database, and/or the like (e.g., a Blockchain) which can securely and accurately provide such information to the extra-vehicular systems.

Alternative or in addition to virtual experience applications relating to real-world experiences at a destination, some virtual experience applications can relate to or simulate landmarks encountered on the journey of the commercial passenger vehicle. For example, a virtual experience application provides virtual content that allows passengers to explore and learn about a given landmark that the vehicle is soon approaching or passing by. Passenger interest and activity with respect to the virtual content can then be used to determine which landmarks are simulated in virtual experience applications for future passengers to enjoy.

Technical solutions disclosed herein include techniques, systems, applications, and technology that allow passengers who have virtually connected (e.g., via an in-flight shared virtual environment or metaverse) to utilize a platform having both virtual and real-life experiences that lets the passengers experiment with these experiences with other passengers and with third-party services related to these experiences (e.g., third-party vendors). These virtual and real-life experiences enjoyed by the passengers can include travel and escape adventure services, products, and packages, and the passengers can utilize the platform to pre-configure, pre-arrange, pre-purchase, and the like these services, products, and packages. In aspects of the technical solutions disclosed herein, virtually-connected passengers can collaborate and arrange mutual life/travel goals (e.g., identifying costs, booking real-life experiences) with the third-party services, thus making collaborative and value-conscious travel decisions. The technical solutions disclosed herein can facilitate discovery of mutual travel goals/interests, building of life-long relationships, and consistent management and use of passenger digital profiles (e.g., applying frequent flyer, hotel, or travel points to pre-arrange real-life experiences).

In example implementations, the virtual content provided by virtual experience applications include extended reality (XR) content (e.g., augmented reality (AR), virtual reality (VR), mixed reality (MR)). Some example implementations of XR content include a digital space that lets a user to play, explore, and connect with other virtual avatars for work, play, learning, and shopping. In addition, it may allow a user to connect with a community without physically being in the exact location. Such interaction can be performed using a smartphone, a computer, or AR/VR devices that offer complete metaverse immersion, such as head-mounted display devices (HMDs). Further example implementations of XR content and virtual experience applications include a platform that allows immersive experience with concerts, comic stories, and even live events packaged into a cinematic entertainment experiment for fans worldwide. Yet another solution provides a platform where people could gather virtually, explore their community, and create digital content in exchange for in-world currency. Further example implementations of XR content and virtual experience applications lets users play and build virtual worlds with the option to monetize their experiences, services, and products for sale or trade. This technology allows users to own non-interchangeable in-game assets such as non-fungible tokens (NFTs) and buy and sell real estate. A further example implementation of XR content and a virtual experience application includes a virtual three-dimensional world-build platform that lets users experiment with owning and trading virtual real estate.

The present disclosure provides technical solutions for passengers on a commercial vehicle (e.g., airline passengers on a flight) to interact with the in-flight entertainment system using metaverse and/or VR technology. The technical solutions disclosed herein can address example limitations where passengers have limited entertainment options. For example, without virtual experience applications that relate to and are useful for pre-configuring and pre-arranging real-life experiences, passengers would have a limited options (e.g., watching movies, listening to music) for spending their time in transit. The technical solutions disclosed herein can further address disadvantages rooted in a lack of social interaction among passengers of a vehicle. Rather than passengers having a less enjoyable and more isolated experience, technical solutions disclosed herein enable passengers to socialize and interact with each other during the journey, and in particular, to collaborate with respect to pre-configuring and pre-arranging mutual real-life experiences. Overall, not having a technical solution that provides virtual experience applications in an in-flight entertainment system could result in a less innovative and less appealing experience for passengers, which could impact customer satisfaction and loyalty.

The present document discloses technical solutions to address the above problems, and others. In some embodiments, an on-board server which becomes a part of the in-flight entertainment (IFE) system, implements Augmented Reality (AR) and/or Virtual Reality (VR) applications within an in-flight shared virtual environment or an in-flight metaverse that provides a virtual world or space in which users can be virtually represented and interact with others. AR combines real-world elements with digital augmentations. That means digital characters and objects appear in your real-world experience through AR technology. Unlike AR, VR is a complete immersion experience for the user into the virtual experience using computer-generated simulation. Therefore, VR may use a headset device that enhances the alternative reality. From modernizing healthcare through VR hospital tours to VR-assisted intensive military training. VR is constantly evolving. VR and education support educational games, learning, and virtual hands-on experience. Occupational safety and health (OSH) can simulate real-life environment hazards before an accident happens.

Example Embodiments for In-Flight Virtual Experience Applications

Example embodiments includes applications (e.g., in a metaverse) that allow passengers who connected during a flight to utilize a virtual world platform having both virtual and real-life experiences that lets users experiment with (test drive) and collaborate with third-party services and vendors related to their travel. Passengers can (collaboratively) use virtual experience applications to pre-configure or pre-arrange services with these travel-related third-party services and vendors. Examples of such travel-related third-party services and vendors include hotel and accommodation providers, escape adventure services, tourism products and packages, and/or the like. Prior to pre-configuring or pre-arranging (e.g., purchasing) services with travel-related third-party services and vendors, passengers can simulate the services (at little/no cost) to determine whether to continue with the purchase. Thus, connected passengers can collaborate and test their mutual life/travel goals and find out the cost/and book real-life experiences with third-party services or vendors. Connected passengers are enabled to make personally-specific and value-conscious travel decisions based on mutual goals/mutual interests and build life-long relationships. In example embodiments, the travel decisions made by passengers can be integrated with digital profiles of the passengers, such as frequency flyer accounts or hotel chain accounts, thereby benefiting future travels by the passengers.

Example embodiments provide technical solutions for passengers to connect and socialize with one another. For example, in existing systems, passengers don't have visibility of other passengers with same interests/travel itinerary on the flight. The IFE, as disclosed herein, can provide a means to let passengers share their interests and connect with each other while in flight prior to meeting in person. Virtual experience applications may be installed on the IFE to coordinate online or virtual interactions among co-passengers. Example applications are configured to allow passengers to connect with each other while in flight. Various features implemented by example embodiments include:

Discovery of other passengers with common itineraries and interests for the purpose of meeting. An in-vehicle system can congregate or direct passengers with such common itineraries/interests in areas within a virtual environment or world. The in-vehicle system can access a digital account or profile for a passenger to determine the itinerary for a passenger, including reservations, accommodations, activities, and/or the like that the passenger has arranged at a destination. An in-vehicle system can provide a bulletin board where passengers can advertise and publish their own itineraries or interests. An in-vehicle system can provide, within a shared virtual environment or world, features that simulate real-world experiences, and these features can be configured to be consumed or interacted with by multiple passengers within the shared virtual environment or world at a time. Passengers can discover others enjoying the same simulation features (e.g., a virtual tour of an amusement park, museum, or the like).

Simulation Features. An in-vehicle system provides features related to various destinations of passengers onboard a vehicle. In some embodiments, an in-vehicle system loads features simulating real-world experiences for a set of destinations that is determined based on the itineraries of the passengers onboard the vehicle. These features can include interactive tours, videos, activities for points of interest at the set of destinations. Via interactions (e.g., inputs, selections) with these features, passengers can control aspects of at least the virtual content that simulates the real-world experiences. Further, passengers can pre-configure aspects of the real-world experience at a destination. For example, passengers can virtually tour different hotel options or tourist attractions, and determine whether to make a reservation. Passengers can then specify aspects of the reservation, for example, with respect to time of day, access level, and/or the like.

Logistical Features. An in-vehicle system provides features related to passenger transportation, accommodation, reservation, and/or the like after a current journey (e.g., after an airplane lands, onboard a subsequent travel segment). These features can be located within a virtual environment or world and can be interactable by multiple passengers at a time, for example, for multiple passengers to coordinate ridesharing, shared lodging, and/or the like.

Social Communication/Conversation: An in-vehicle system enables social communication/conversation between passengers via respective virtual avatars within the shared virtual environment. The virtual avatars for passengers can visually represent passengers in a text-based messaging application. The virtual avatars for passengers can visually represent passengers for a proximity-based voice communication within the shared virtual environment; for example, the passengers can move their virtual avatars and talk using voice with nearby virtual avatars. The virtual avatars for passengers can visually represent passengers in a video-based call or conference application; for example, a virtual avatar can be visually overlaid a passenger in a video stream for the video-based call or conference application to obscure and anonymize the passenger. These social communication/conversation features can be enjoyed by passengers in a casual or friendship context, in a professional context, a dating or romantic context, and/or the like.

Travel Features. An in-vehicle system can provide features related to the current travel or journey of the commercial passenger vehicle. For example, a flight map can be provided in an immersive manner in an XR form of or XR feature within the shared virtual environment, to allow a passenger to fly around a virtual world and along a path of the vehicle. As a further example, the shared virtual environment can include an interior layout of the commercial passenger vehicle, a tour of the interior layout and/or other features of the commercial passenger vehicle, and/or the like.

In some embodiments, the metaverse application allows passengers to create their user profiles on the plane. The passenger profile will allow passenger to attach a photo of themselves either using a seatback monitor's built-in camera, or by using other means to transfer a photo of themselves to the IFE system. The passenger profile will allow passenger to provide their personal information like:

Name
Picture (optional)
Seat number
Where I'm going
When I'm going
What activity I'm planning to do at my destination This profile information can be published to other passengers in a bulletin board-like fashion where passengers post information about themselves and their travel plans/intentions. In some embodiments, a passenger first makes a post describing him/herself, where they're going, when they're going and what activities they're planning to do. The initial post contents may be subject to airline configured censorship filtering based on pre-configured censored keywords. Other passengers see this post and can reply to show interest to meet. The original poster (OP) will get an alert when another passenger has responded to the original post. The OP has option to respond privately and reveal their seat number to have further conversations. Alternatively, or additionally, the OP has options to respond privately with contact information, to set a meeting point in the airport or travel hub (e.g., train station, ferry port) after the flight, and/or the like.

Once two passengers have engaged and connected (e.g., via the bulletin board, via encountering respective avatars in a virtual world), the two passengers can enter a combined interactive session of a virtual experience application, or collaboratively interact with a virtual feature relating to a real-world experience. Through the combined interactive session or the collaborate interaction, the two passengers can pre-configure and pre-arrange aspects of the real-world experience. For instance, the two passengers can reserve seats on the same tourist attraction tour (e.g., based on a decision to enjoy the tour together), make a restaurant reservation together, book shared transportation associated with various mobility operators (e.g., public transportation authorities, ridesharing operators, electric vertical take-off and landing (eVTOL), and the like).

In some embodiments, virtual features or virtual experience applications can be integrated with other applications implemented by an IFE system, such as applications described by U.S. Pat. No. 11,518,517 titled "PREDICTIVE PREFERENCE SELECTION FOR IN-VEHICLE ENTERTAINMENT SYSTEMS" and filed on Aug. 26, 2019, U.S. Pat. No. 11,492,119 titled "METHODS AND SYSTEM FOR STREAMING CONTENT ON A TRANSPORTATION VEHICLE" and filed on Jun. 23, 2021, and U.S. Pat. No. 11,228,789 titled "VEHICLE ENTERTAINMENT SYSTEMS FOR COMMERCIAL PASSENGER VEHICLES" and filed on May 6, 2020, the contents of each of which being incorporated in their entirety by reference. For example, pre-populated passenger profile and itinerary can be accessed and used for suggesting engagement and connection between passengers with similar itineraries. As a further example, integration with these other applications can allow the passenger to use the same profile information over different flights. As a further example, integration with these other applications can enable recommendations for passengers to meet others with similar interests. Integrations with these and other applications that may be implemented by an IFE system can also enable recommendations for point-of-interests, restaurants, destinations, and/or the like (or recommendations for virtual experience applications that relate to or simulate such point-of-interests and the like).

Other integrations of the metaverse application with other applications can include integrating with a companion application implemented on a personal passenger device (e.g., a smartphone, a tablet, a laptop). A companion application can integrate user information into an in-flight shared virtual environment and can be used to take a picture used for a passenger profile.

In some embodiments, passengers can opt in to use and enjoyment of virtual experience applications with other passengers. In some embodiments, passengers who opt-in can view other passenger's profiles and be able to contact them within the in-flight shared virtual environment. This opt-in and consent by passengers can facilitate compliance with general data privacy requirements.

In some embodiments, a virtual experience application provides modifiable and immersive entertainment content. The entertainment content is modifiable to include virtual avatars for passengers who have selected the entertainment content (e.g., a movie) for consumption during the vehicle journey. A virtual avatar for a passenger can be inserted into a portion of visual content of a movie. This experience can be shared with other passengers. Together, passengers can represent themselves as virtual avatars within a mutually-selected movie as entertainment. Passenger activity via their virtual avatars inserted within a movie can be recorded in data records or data logs for the in-flight shared virtual environment. These data records or data logs can be anonymized and then shared with movie producers, theaters, and/or other third-party systems. In particular, anonymization of these data records or data logs can be based on the passengers being represented by virtual avatars characterized by a specified level of anonymity, or conveying only a certain set of personal attributes of the passengers.

In some embodiments, the metaverse application enables use of entertainment content as the virtual avatar for a passenger, and the metaverse application can share usage of the entertainment content with third-party services (e.g., movie producers, theaters) as feedback to guide movie development. For example, multiple passengers can choose Indiana Jones (or a virtual avatar styled as Indiana Jones) as their virtual avatar within the in-flight shared virtual environment, and state data for the in-flight shared virtual environment (or data records capturing states, usage, activities within the in-flight shared virtual environment) can be shared by the IFE system with third-party systems in an anonymized manner.

In some embodiments, a virtual experience application relates to shopping or retail experiences. Example embodiments of such a virtual experience application can allow passengers to try on items and merchandise virtually on their virtual avatar. The passengers, through virtual immersion and experimentation, can decide whether to purchase retail items, and execute the purchase via the virtual experience application.

According to these example embodiments, passengers are able to enjoy enhanced experiences with IFE systems while in flight and additional opportunities for interaction with other passengers.

Example Embodiments Include Various Components/Aspects

1. Platform/Interactive: Passengers would have the opportunity to create and customize their own meta-avatars or download their existing meta-avatar from digital locker, which they could then use to participate in virtual activities and experiences during their flight. Passenger opportunities to manage meta-avatars and digital representations may not be limited to journey-related occasions. For example, a passenger can create/maintain their meta-avatar offline and/or at home.

2. Technology: An in-vehicle system can include virtual reality headsets or augmented reality devices, so that passengers can fully immerse themselves in the virtual activities and experiences related to their journeys.

3. Content: The virtual content provided in virtual experience applications can be developed by third-party content creators, or entities not belonging to a mobility operator associated with the commercial passenger vehicle. In particular, the third-party content creators can be associated with third-party services or vendors providing real-life or real-world experiences at destinations. Thus, the third-party content creators provide virtual content that can accurately simulate the real-life experiences and that can integrate with extra-vehicular systems used by the third-party services or vendors to provide the real-life experiences. The virtual content includes engaging and interactive experiences for passengers to enjoy. These experiences could range from (but not limited to):

a. Passenger's avatar playing a role in a movie
b. Virtual tours
c. Games
d. Social activities
e. In-flight shopping
f. Entertainment purchases etc.

4. On-going support: Once the meta-avatar system is in place, a mobility operator for the in-vehicle system would need to ensure that the technology is well-maintained and supported, and that there are sufficient content and experiences for passengers to participate in. Virtual experience applications can be updated (e.g., during vehicle maintenance periods) to ensure that virtual content is up-to-date and accurate with respect to real-life experiences at destinations. Virtual experience applications can also be updated to ensure that the applications continue to integrate or communicate with the extra-vehicular systems used by third-party services or vendors to provide the real-life experiences. For example, a virtual experience application can be updated to remain compatible with a ledger or reservation system used by a hotel operator for managing hotel reservations, such that the virtual experience application can continue communication user selections made in-flight for pre-arranging a hotel experience or reservation. As another example, passengers/users can create/edit/maintain their meta-avatars at home and/or offline, and the virtual experience application can be configured to synchronize with the latest version of passenger meta-avatars.

5. Security: Example embodiments consider privacy, data protection, and intellectual property issues related to the use of meta-avatars. Passengers when collaboratively interacting with virtual features or experiences can remain anonymous to a specified degree from one another.

6. Example embodiments enables passengers that fly and want to meet other people on the flight to:

Discover other people with common itineraries and interests for the purpose of meeting and furthering their travel plans together after landing.
Explore example sightseeing/points of interests, rideshare, share lodging.
Meet new people on the flight to make social conversation.
Make new friends and keep in touch after the flight.
Build professional relationships or dating relationships.
Dating Overall, travel-related virtual experiences being provided in-flight to passengers has the potential to provide passengers with a unique, useful, and engaging experience during their flight.

Example Systems for In-Flight Virtual Experiences

FIG. 1 shows an exemplary overview of an IFE system installed in an airplane 102. The IFE system includes a plurality of seatback devices 104 or seatback monitors. In some embodiments, the seatback devices 104 include an in-device terminal or computing unit. In some embodiments, the seatback devices 104 are communicably coupled to computing units (e.g., computers) that may be located in a seat below one or more seatback devices 104. For example, one or more seatback devices 104 located in a row in the airplane 102 may be communicable coupled to one computing unit located below a seat in the row. In another example, each seatback device 104 may be communicably coupled to a respective computing unit that is located in the seat where the seatback device 104 is located.

Each of the plurality of seatback devices 104 (or computing units to which the seatback devices 104 are coupled) may include an ethernet connector which allows the plurality of seatback devices 104 to be communicably coupled to a server 106 via, for example, an Ethernet switch. In some embodiments, the server 106 is configured to generate, provide, and operate an in-flight shared virtual environment, virtual world, virtual metaverse, and/or the like. In some embodiments, the server 106 is configured to configure and operate virtual experience applications (e.g., within the in-flight shared virtual environment) that provide immersive and virtually-generated visual content that relates to or simulates real-life travel journey experiences. These virtual experience applications can be pre-loaded onto the server 106 and can be updated (e.g., via over-the-air (OTA) updates, via installation updates) at the server 106. In some embodiments, the server 106 includes one or more processing units configured to implement example operations disclosed herein at least to provide virtual content (e.g., immersive VR content, combined AR or MR content) to passengers. For example, the virtual experience applications can be stored in memories of the server 106 and executed by the processing units of the server 106.

In some embodiments, the server 106 is communicably coupled (e.g., via Ethernet switch) to one or more wireless access points 108. Thus, in such embodiments, passengers may use passenger devices 110 (e.g., computers, laptops, mobile phones, tablets, XR devices such as head-mounted display devices) to connect to the one or more wireless access points 108 so that the passenger devices 110 can communicate with the plurality of seatback devices 104 via the server 106. In some embodiments, a passenger may operate one or more passenger devices 110 (e.g., smartphones, laptops, tablets, communication devices, entertainment devices) while on-board the vehicle, and the passenger devices 110 of a passenger is connected to a seatback device 104 and/or the server 106 of the IFE system.

In some embodiments, each of the plurality of seatback devices 104 is configured such that a passenger device 110 can directly communicate with a seatback device 104 (or a computing unit to which the seatback device 104 is coupled). For example, each seatback device 104 is configured for Bluetooth or Bluetooth Low Energy (BLE) communication with passenger devices 110. Accordingly, a seatback device 104 is configured to detect nearby candidate passenger devices, establish a connection or pairing with a passenger device 110, and transmit/receive data via the connection or pairing with the passenger device 110. In some examples, a seatback device 104 is configured for direct communication with passenger devices 110 via other means, such as a near-field communication (NFC) device via which a passenger device 110 directly communicates with the seatback device 104. In some embodiments, virtual content (XR content) generated and configured by virtual experience applications implemented by the server 106 can be displayed to a passenger via one or more of a passenger device 110 and a seatback device 104.

While FIG. 1 illustrates an example of an aircraft, embodiments disclosed herein are applicable to other commercial passenger vehicles. For example, embodiments disclosed herein enable passengers on a train to connect and collaborate with virtual and real-life experiences.

Figure 2:
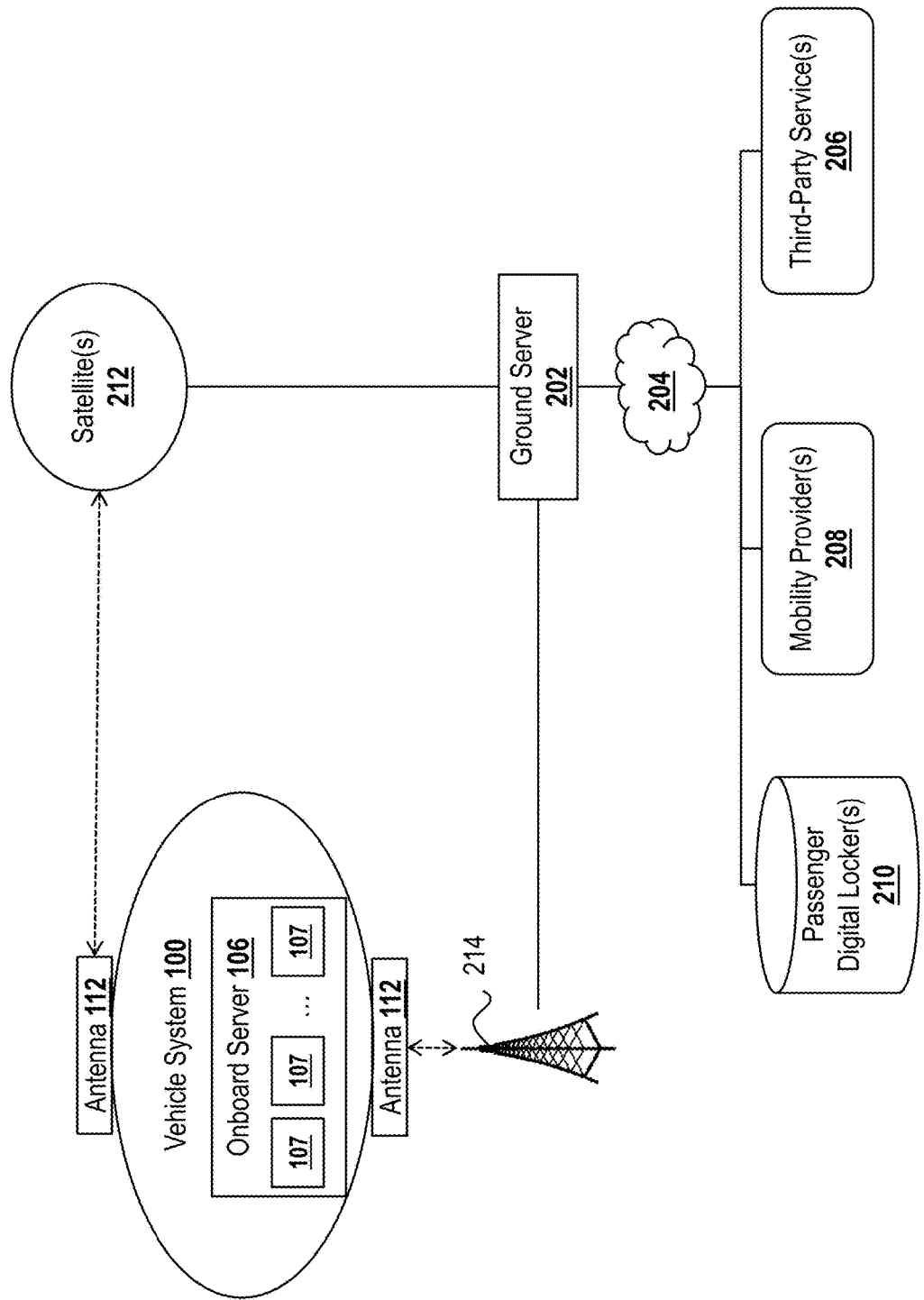
FIG. 2 is a block diagram of an example system for generating and providing an in-flight shared virtual environment in which passengers of a commercial passenger vehicle can securely interact with other passengers of the commercial passenger vehicle.

FIG. 2 shows an example system for data gathering, processing, and usage for providing in-flight virtual experiences related to real-life journey experiences to passengers onboard a commercial passenger vehicle. In particular, FIG. 2 shows a communication network in which information can be obtained by a vehicle system 100 (e.g., the vehicle system 100 shown and described with FIG. 1) that includes in-vehicle and onboard system(s) (e.g., server(s)) for providing the virtual experiences to passengers.

As discussed above, the vehicle system 100 includes an onboard server 106, and the onboard server 106 is configured with or implements one or more virtual experience applications 107. Each of the virtual experience applications 107 are configured to generate and provide virtual content, which can include visual content, audio content, tactile or haptic feedback and/or the like. The virtual content generated and provided by a virtual experience application 107 can be completely or substantially immersive (according to a VR form), or can be combined and overlaid with a real physical world (according to an AR or MR form). For example, VR virtual content may be visually consumed by a passenger through the use of a head-mounted display device that is communicably coupled with the onboard server 106. As a further example, AR/MR virtual content can be audibly provided in combination with a real-time camera feed (e.g., from a camera onboard the vehicle that captures landmarks that the vehicle passes by), visually overlaid a real-time camera feed (e.g., from a camera included in a personal electronic device operated by a passenger), and/or the like.

The one or more virtual experience applications 107 implemented by the onboard server 106 can correspond to different real-life experiences, for example, different experiences provided by different mobility providers and third-party services. For example, the virtual experience applications 107 include a gaming application, a travel application, and a financial application. The different virtual content provided across different virtual experience applications 107 can therefore originate from different third-party partners, content creators, vendors, services, and/or the like. Passengers, via personal electronic devices and/or seatback display devices, can thus select from multiple virtual experience applications 107 to enjoy a desired experience. In some embodiments, the onboard server 106 is configured to execute and operate sessions for multiple virtual experience applications 107 at a time, in order to serve the multiple passengers onboard the vehicle. Accordingly, throughout a commercial passenger vehicle, different passengers can enjoy different experiences offered by the virtual experience applications 107.

In order to provide virtual content and to effectuate or translate user selections for the virtual content to real-life experience, a virtual experience application 107 may be in communication with a corresponding third-party service/vendor providing the real-life experience. The communication network shown in FIG. 2 illustrates example means by which virtual experience applications 107 implemented by a vehicle system 100 can communicate with extra-vehicular systems.

According to example embodiments, a ground server 202 obtains information for generating and providing virtual content for simulating real-life travel journey experiences. In some embodiments, the ground server 202 installs, hosts, implements, and/or the like the latest versions of virtual experience applications 107, and the ground server 202 copies, installs, synchronizes, updates, and/or the like the virtual experience applications 107 onto the onboard server 106 of the vehicle system 100 prior to the vehicle beginning its journey. For example, installation/updating of virtual experience applications 107 onboard the vehicle occurs at a pre-flight stage, such that the virtual experience applications 107 are ready to be used by passengers during the flight. The information related to virtual content and virtual experience applications obtained by the ground server 202 can include software installation packages, software updates, content packages (e.g., including digital artwork or procedurally-generated visual features), and/or the like.

As illustrated, the ground server 202 may obtain this information or data via a network 204 (e.g., the Internet) from extra-vehicular systems associated with third-party services 206 and mobility providers 208, and passenger digital lockers 210. For example, the ground server 202 can obtain a virtual experience application (or data therefor) from a third-party service 206 associated with a museum at a destination, and the virtual experience application obtained by the ground server 202 is configured to generate virtual content simulating a tour of the museum. As another example, the ground server 202 can obtain a virtual experience application (or data therefor) from a mobility provider 208 that operates a subsequent travel segment or leg for some passengers, and the virtual experience application provides virtual content that simulates features of a vehicle for the subsequent travel segment or leg (e.g., a rideshare car, a train, an aircraft, an eVTOL). Other examples of virtual experience applications associated with third-party services 206 and mobility providers 208 are contemplated.

The information obtained by the ground server 202 from passenger digital lockers 210 enable consistent and ubiquitous identity of passengers within a digital world, or metaverse. A passenger may be associated with multiple digital or online accounts/profiles, a passenger digital locker 210 for a given passenger represents a collection of digital personas, profiles, accounts, avatars, and/or the like used by the given passenger in digital spaces. For example, a given passenger may be associated with a customized video game avatar operated by the given passenger within a video game application, a frequent flyer online profile or account, a social media account, and these digital personas for the given passenger can be referenced by and managed via a passenger digital locker 210. In some embodiments, the passenger digital locker 210 may be a database, a data structure, a data entity, a data platform, and/or the like that enables retrieval of, access to, and/or interfacing with (e.g., by the ground server 202) these digital personas of a passenger or user. Some of the digital representations of a passenger that are "stored" in a passenger digital locker 210 may be associated third-party platforms. For example, the passenger digital locker 210 may store references to interfaces (e.g., application programming interfaces (APIs)) for a third-party platform, such that a ground server 202 can discover and then retrieve a digital representation or virtual avatar associated with the third-party platform.

These digital personas/accounts/profiles can be used to customize the virtual experiences for passengers. First, certain virtual experience applications may be identified and recommended (e.g., by the ground server 202, by the onboard server 106) for a given passenger based on the passenger's online or digital presence indicated by the passenger's passenger digital locker 210. For example, the passenger digital locker 210 for a passenger can include a digital account for a hotel chain, and accordingly, the ground server 202 loads a virtual experience application 107 associated with the hotel chain onto the vehicle system 100 to allow the passenger to, during the flight, enjoy virtual content related to the hotel chain and make arrangements and modifications for staying at the hotel chain after the flight. Additionally, the passenger digital locker 210 for a passenger can be used to generate virtual representations or avatars of the passenger within a virtual world or space in which the passenger collaborates and interacts with other passengers on virtual experiences.

In some examples, the ground server 202 may communicate the information with one or more satellites 212 (e.g., via a satellite dish), and the information is in turn received in the vehicle system 100 (e.g., by an onboard server 106) via an antenna 112 onboard the commercial passenger vehicle. Alternatively, or additionally, the ground server 202 may communicate the information to the vehicle system 100 through a terrestrial connection such as through cellular communication via a cellular network 214 to an antenna 112 onboard the commercial passenger vehicle that is configured for cellular reception. In some embodiments, the connectivity between the ground server 202 and airplane equipment may be based on a local area wireless network (e.g., a Wi-Fi access point) or a cellular communication network (e.g., cell tower) which may be available to the vehicle system 100 for communication while during a flight or when parked at an airport terminal, near the gate area.

The communication network illustrated in FIG. 2 can further be used by the vehicle system 100 to communicate information back to the ground server and extra-vehicular systems associated with the third-party services 206, mobility providers 208, and passenger digital lockers 210. While enjoying a virtual experience application 107, passengers can make selections, inputs, and/or the like to control aspects of the virtual experience and/or to pre-configure or pre-arrange aspects of a corresponding real-life experience. For example, passengers can, based on virtually touring a hotel located at a destination, make selections or inputs to arrange a reservation for a specific room, room type, or wing of the hotel. As a further example, passengers can, based on virtually exploring different transportation options for a subsequent travel segment or leg, indicate a desire to reserve transportation through a particular mobility provider (e.g., a ridesharing operator, an eVTOL operator, a public transportation authority) after the current flight. These user selections and inputs can be communicated by the vehicle system 100 to the ground server and extra-vehicular systems, such that user desires (that are informed through the virtual experiences) can be applied to real-life experiences to be enjoyed by the passengers after the current flight.

Thus, in some embodiments, the vehicle system 100 can transmit, via satellites 212 and/or terrestrial connections (e.g., a cellular network 214), user selections and inputs within virtual experience applications 107 to the ground server 202 and other extra-vehicular systems. In some embodiments, the vehicle system 100 transmits user selections and inputs within the virtual experience applications 107 in real-time if the vehicle system has a reliable connection to the satellites 212, terrestrial networks, and other communication means. In some embodiments, the vehicle system 100 transmits the user selections and inputs within virtual experience applications 107 at a post-flight stage or upon near a destination where the vehicle system 100 establishes a connection with a terrestrial network. In some embodiments, the communication network of FIG. 2 can apply user selections and inputs for modifying real-life destination experiences according to the systems and techniques disclosed in U.S. patent application Ser. No. 18/349,768 filed on Jul. 10, 2023, titled "AUTHENTICATED MODIFICATIONS OF MULTI-PARTY LEDGER DATA DURING USER CONNECTIVITY VIA IN-FLIGHT SYSTEMS" and U.S. patent application Ser. No. 18/349,812 filed on Jul. 10, 2023, titled "MOBILE AUTHENTICATION AND CONTROL OF DIGITAL RECORDS CAPTURING REAL-WORLD MULTI-PARTY INTERACTIONS," the contents of each of which being incorporated by reference in their entireties herein. In some embodiments, in order to preserve user privacy and security, the vehicle system 100 only transmits user selections and inputs pertaining to pre-configuration and pre-arrangement of corresponding real-life experiences.

Similar to the server systems onboard the aircraft described above, the ground server is understood to be a standalone computer system, or multiple standalone computer systems with general purpose data processors, memory, secondary storage, and/or a network interface device for connecting to each other. The computer systems may have an operating system installed thereon, along with the server applications that implement the various components of the system for generating and providing an in-flight shared virtual environment. The ground server may interface with the extra-vehicular systems associated with third-party services 206, mobility providers 208, and passenger digital lockers 210 in order to implement virtual experience applications 107 onboard the vehicle for in-flight use and to communicate user selections and inputs within the virtual experience applications 107 to the extra-vehicular systems.

Figure 3:
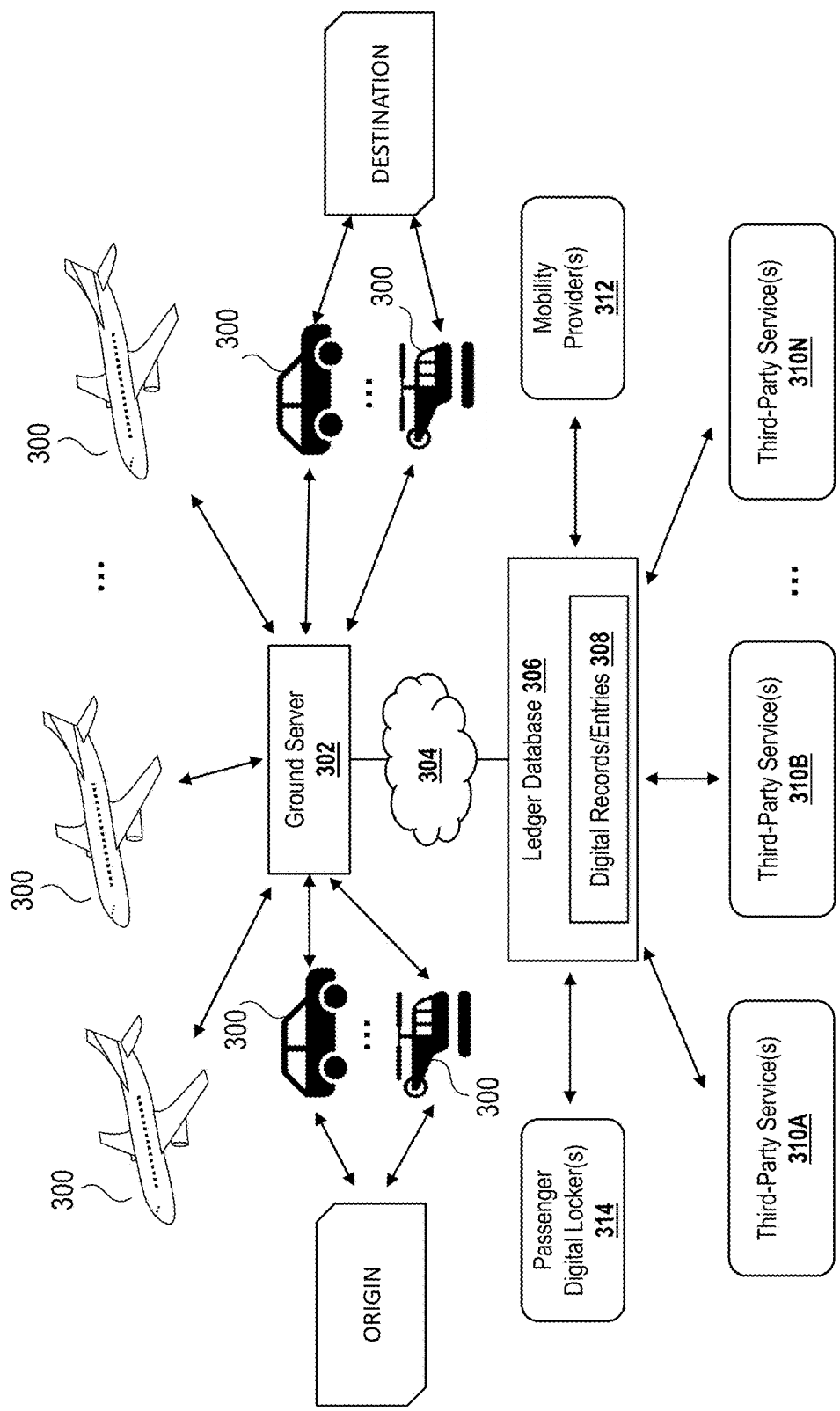
FIG. 3 is a block diagram of an example system for generating and providing an in-flight shared virtual environment in which passengers of commercial passenger vehicles can securely interact with other passengers.

FIG. 3 shows an exemplary system in which a ground server 302 communicates with vehicles 300 (or vehicle systems onboard the vehicles 300) to exchange data related to in-flight virtual experiences for vehicle passengers. In the illustrated example, vehicles 300 include commercial passenger vehicles via which the passengers embark on flights between origin and destination (e.g., trains, planes, boats), as well as other transportation means/modes involved in the overall passenger journey, such as taxis, rideshare vehicles, eVTOLs, and the like that a passenger may use to travel to and from a travel hub. According to FIG. 3, the ground server 302 can communicate with multiple vehicles 300 to support the provision of in-flight virtual experiences for passengers onboard the vehicles 300. The ground server 302 may communicate with each of the vehicles 300 via satellite connection, direct communication links, cellular networks, local area networks, and/or the like. A vehicle 300 may establish connection with the ground server 302 at certain points or stages of a travel segment or journey. For example, a vehicle 300 may connect with the ground server 302 at a pre-journey stage and a post-journey stage, but in some examples, the vehicle 300 may not be connected with the ground server 302 while undertaking the journey (e.g., a flight). Accordingly, in some examples, the vehicle 300 (or its vehicle systems including onboard server(s)) may communicate user selections and inputs with respect to in-flight virtual experiences in response to re-establishing connection with a ground server 302 after or at an end of a journey.

The ground server 302 is communicably coupled (e.g., via a network 304) with a ledger database 306 storing digital records 308 or entries. The ledger database 306 may be a central database, shared database, consensus-based database, and/or the like that is used among third-party services 310 (e.g., 310A, 310B, 310N), mobility providers 312, and passenger digital lockers 314. For example, the ledger database 306 is a blockchain. The digital records 308 or entries stored in the ledger database 306 can relate to real-life experiences arranged for the travel of passengers onboard the vehicles 300. For example, the ledger database 306 is used by a hotel service to record hotel reservations, a museum to manage tour schedules, a mobility provider to assign seat tickets, and/or the like. Thus, each of the third-party services 310, the mobility providers 312, and passenger digital lockers 314 can be communicably coupled with the ledger database 306, and may have read and/or write access for digital records 308 stored in the ledger database 306.

According to example embodiments, the ground server 302 can process and apply user selections and inputs made with respect to virtual experiences to the real-life experiences recorded in the ledger database 306. As an illustrative example, two passengers onboard a vehicle 300 can determine, based on a virtual experience, that they would like to mutually reserve a tour at a museum at their destination. An indication thereof is communicated from the vehicle 300 to the ground server 302, which can then record the indication as a digital record 308 or entry within the ledger database 306. In the illustrative example, an extra-vehicular system or platform associated with the museum can access the digital record 308 and effectuate or fulfill the two passengers' desire to mutually tour the museum.

Example Operations for In-Flight Virtual Experiences

Figure 4:
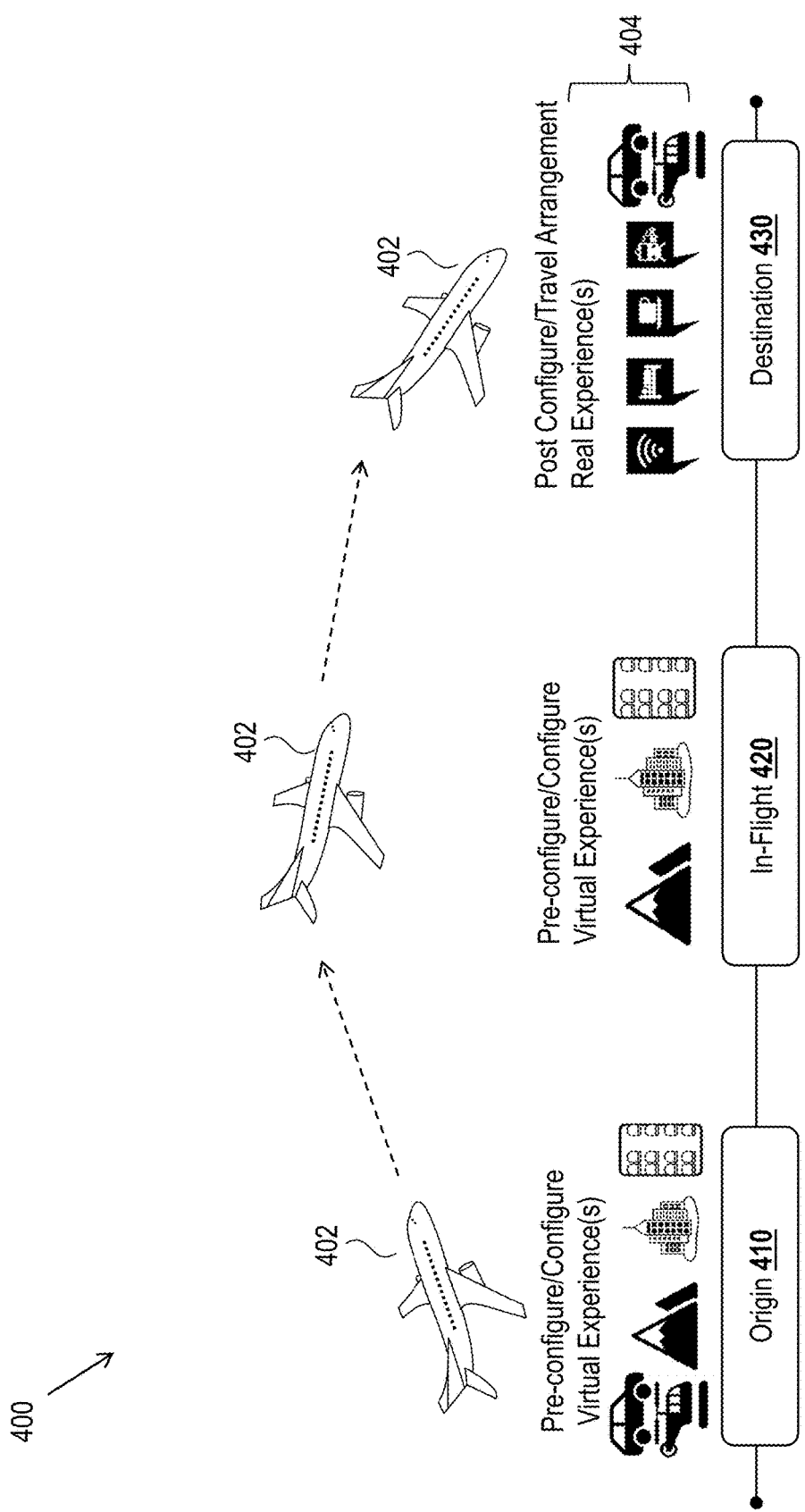
FIG. 4 illustrates examples of real-world experiences that can be simulated via virtual experience applications provided in-flight to passengers onboard a commercial passenger vehicle.

FIG. 4 is a diagram illustrating an example journey 400 of a commercial passenger vehicle 402. A journey 400 generally includes an origin stage 410, an in-flight stage 420, and a destination stage 430. A journey 400 includes or is associated with, at its different stages, various real-life experiences that can be simulated, according to the technical solutions disclosed herein, by virtual experiences provided in-flight to passengers onboard the commercial passenger vehicle 402.

Examples of real-life experiences 404 related to a destination stage 430 of a journey 400 include travel and tourism experiences at destinations to which the passengers are traveling. These may include hotel and accommodation experiences, tourist attraction experiences, restaurant and dining experiences, transportation experiences, and the like that the passengers would be able to experience subsequent to the commercial passenger vehicle 402 reaching a destination of the journey 400. Accordingly, through corresponding virtual experiences provided in-flight prior to the commercial passenger vehicle 402 reaching the destination, passengers can preview and simulate these real-life experiences 404. Based on the previewing and simulating via in-flight virtual experiences, passengers can decide whether they want to experience the real-life experiences 404 at their destinations before reaching their destinations. The informed decisions by passengers are communicated from the commercial passenger vehicle 402 to extra-vehicular systems or platforms to effectuate, pre-configure, arrange, reserve, or the like the real-life experiences 404 for the passengers.

An in-flight stage 420 of a journey 400 includes real-life experiences 404 arising within the commercial passenger vehicle 402, as well as from real-life landmarks by which the commercial passenger vehicle 402 passes. For example, the commercial passenger vehicle 402 may pass by significant real-life landmarks such as mountain ranges, large cities, and/or the like. These real-life landmarks can be simulated in more immersive forms (e.g., in VR) as a virtual experience for passengers to enjoy. For example, passengers can virtually traverse or fly around a mountain peak to more immersively experience and enjoy the mountain peak when the vehicle 402 passes by it. In some embodiments, in-flight virtual experiences that simulate real-life experiences 404 for an in-flight stage 420 can be triggered by proximity of the commercial passenger vehicle 402 to the real-life experiences 404. In some embodiments, in response to the commercial passenger vehicle 402 being located within a predetermined range of a real-life experience 404, an in-flight virtual experience related to the real-life experience 404 is made available or indicated to passengers onboard the commercial passenger vehicle 402. Another example of an in-flight real-life experience relates to an in-vehicle layout of the commercial passenger vehicle 402. Passengers can enjoy an in-flight virtual experience in which the passengers can virtually walk around or navigate amongst the seats inside the commercial passenger vehicle 402. This in-flight virtual experience may be provided in connection with a social application that enables and encourages passengers to meet other passengers onboard the commercial passenger vehicle 402.

An origin stage 410 or a pre-flight stage of the journey 400 includes real-life experiences 404 and/or virtual experiences that can be used by passengers onboard the commercial passenger vehicle 402 to pre-configure aspects of in-flight virtual experiences and/or real-life experiences at the destination. In some embodiments, passengers can select the real-life experiences that are available for simulation during the journey, prior to boarding the commercial passenger vehicle 402. Real-life experiences 404 at the origin stage 410 or pre-flight stage can also be simulated in in-flight virtual experiences, for example, in case the passengers intend on revisiting or re-experiencing those real-life experiences 404 at their journey origin. For example, passengers embarking on a round trip journey may use in-flight virtual experiences that correspond to real-life experiences 404 at their journey origin (e.g., amenities offered at an origin airport, transportation modes available at the journey origin) in order to pre-configure or pre-arrange aspects of the real-life experiences 404 for the return leg of their round trip.

The experiences disclosed herein can occur at any transportation stage between origin and destination, as demonstrated with at least FIGS. 3 and 4. In some embodiments, the passengers can enjoy the virtual experiences for travel experimentation and collaboration at the origin of a journey (e.g., during transportation to a travel hub, for example, via an eVTOL, a taxi, a ridesharing vehicle), during a flight of a commercial passenger vehicle (e.g., airplane, train, boat), and at a destination of the journey (e.g., during transportation from a travel hub, for example, via an eVTOL, a taxi, a ridesharing vehicle). The virtual experiences can simulate and enable experimentation and pre-configuration/arrangement of real-life experiences associated with the origin stage or portion of the journey (e.g., real-life experience of traveling to the travel hub, for example, via an eVTOL, a taxi, a ridesharing vehicle; real-life experiences of amenities provided at the travel hub), real-life experiences associated with the flight of the commercial passenger vehicle, and real-life experiences associated with the destination stage or portion of the journey (e.g., real-life experience of traveling from the travel hub, for example, via an eVTOL, a taxi, a ridesharing vehicle; real-life experiences of amenities provided at the travel hub; real-life experiences of tourism attractions and activities at the destination location).

In some embodiments, provision of the virtual experiences during journey stages other than the flight of the commercial passenger vehicle can be implemented according to a predefined arrangement between a mobility operators associated with the different journey stages. For example, the predefined arrangement can include a shared payment/royalty arrangement between an eVTOL operator that provides virtual experiences as a passenger travels to a travel hub for a flight, and an airline operator that provides in-flight virtual experiences for the passenger onboard the commercial passenger vehicle. This and other arrangements can be predefined to enable and facilitate continuity between virtual experiences enjoyed by a passenger across journey stages. For example, a passenger can begin a virtual experience while in a taxi during the origin stage of their journey and continue the virtual experience onboard a commercial passenger vehicle during the flight stage of their journey. Based on detecting that a virtual experience is continued across journey stages, example embodiments involve recording (e.g., by a ground server) parties, such as the different mobility operators, involved in the virtual experiences provided to the passenger, such that a shared payment/royalty arrangement can be applied and effected. Involvement of a given mobility operator or party can be determined with respect to virtual experience duration and/or proportion, whether the passenger starts the virtual experience with the given mobility operator or party, whether the passenger completes the virtual experience with the given mobility operator or party, and/or the like. The records that capture respective involvement of mobility operators or parties across multiple journey stages of a passenger can be stored in a database (e.g., ledger database shown in FIG. 3), used to determine and effect payments between mobility providers and/or third-party services, and/or the like. In some embodiments, for a set of virtual experience applications provided via an in-flight shared virtual environment, at least one of the set of virtual experience applications is configured to be enjoyed by a passenger also in an origin stage and/or a destination stage of the passenger's journey. Certain virtual experience applications can be configured as such continuable (or multi-stage) experiences based on an existence of a shared payment/royalty arrangement between a mobility operator associated with the flight and another mobility operator associated with the origin stage or the destination stage.

Figure 5A:
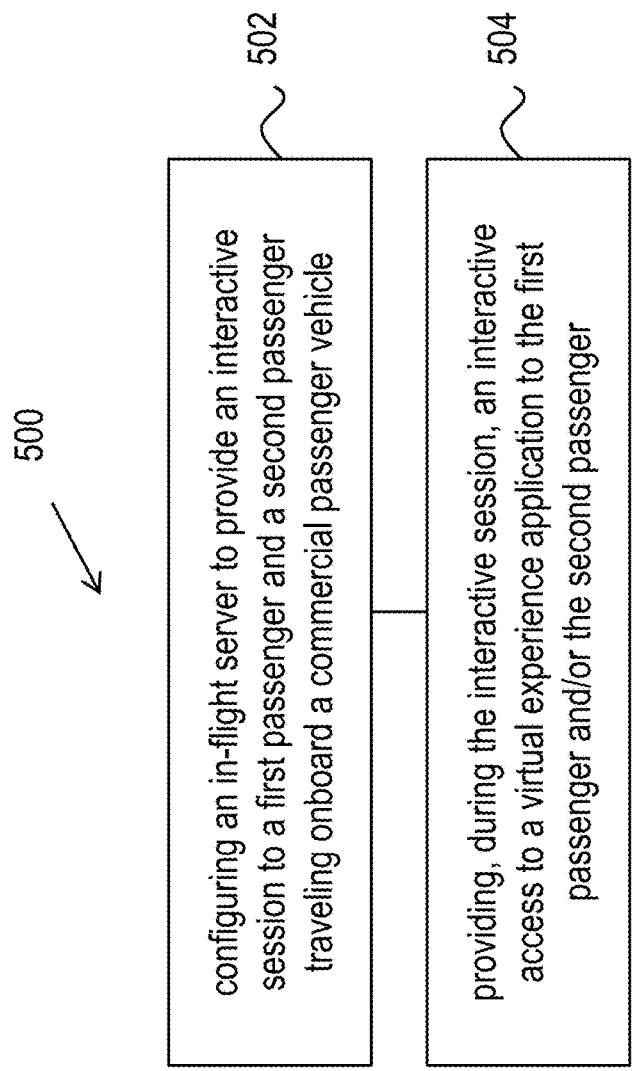
FIGS. 5A-5B are flow diagrams illustrating example operations for providing an in-flight shared virtual environment for secure interactions between passengers onboard a commercial passenger vehicle.
Figure 5B:
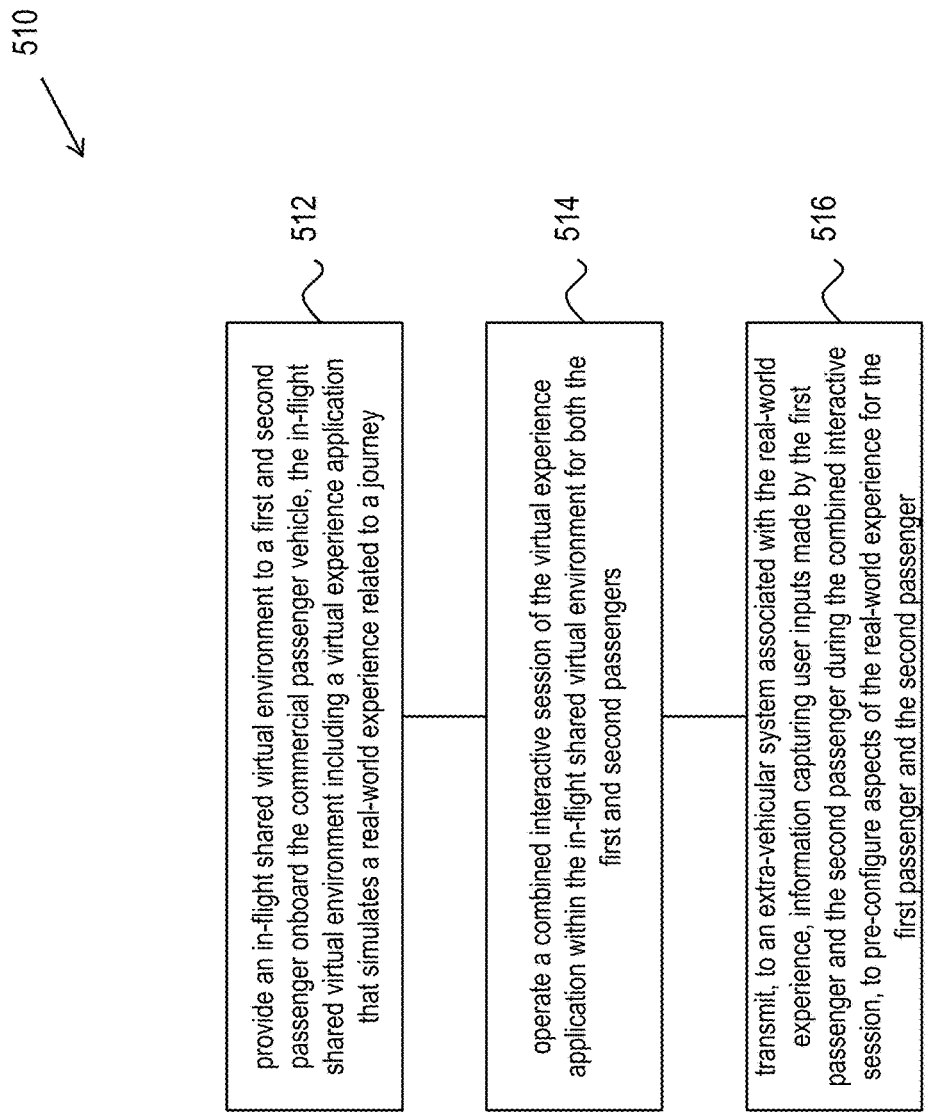

FIGS. 5A-5B are flow diagrams illustrating example operations performed to generate and provide in-flight virtual experiences that simulate travel-related real-life experiences and that enable passengers to pre-configure or pre-arrange aspects of the travel-related real-life experiences.

Referring first to FIG. 5A, an example method 500 can be implemented by a mobile platform (e.g., an in-vehicle connectivity system, an in-vehicle edge network, an in-flight entertainment system, and/or the like) to provide its passengers with virtual experiences relating to or simulating real-life experiences for their journeys. At block 502, the mobile platform configures an in-flight server to provide an interactive session to a first passenger and a second passenger traveling onboard a commercial passenger vehicle. At block 504, the mobile platform provides, during the interactive session, an interactive access to a virtual experience application to the first passenger and/or the second passenger. In some embodiments, the method 500 further comprises ending, at an end of travel, the interactive session according to a configuration specified by a priori rule or an input received from the first passenger or the second passenger. In some embodiments, the virtual experience application comprises a gaming application, a travel application, or a financial application.

Turning now to FIG. 5B, an example method 510 can be implemented by a mobile platform (e.g., an in-vehicle connectivity system, an in-vehicle edge network, an in-flight entertainment system, and/or the like). At block 512, a mobile platform or in-vehicle system onboard the commercial passenger vehicle provides an in-flight shared virtual environment to a first passenger and a second passenger onboard the commercial passenger vehicle. The in-flight shared virtual environment may be an environment having virtual features or virtual experience applications that can be cooperatively enjoyed by the first passenger and the second passenger. In some examples, the in-flight shared virtual environment is an in-flight virtual world or virtual metaverse from which the first passenger and the second passenger can select virtual experience applications to open. For example, the in-flight shared virtual environment is a virtual world through which the first passenger and the second passenger can control and move respective virtual avatars, and the first passenger and the second passenger can select a virtual experience application based on controlling their respective avatars to interact with an interactable feature within the virtual world for the virtual experience application.

At block 514, the mobile platform operates a combined interactive session of the virtual experience application within the in-flight shared virtual environment for both the first and second passengers. The mobile platform can operate the combined interactive session based on the virtual experience application being selected by both the first passenger and the second passenger. In some examples, the first passenger and the second passenger may mutually select the virtual experience application based on a social connection, conversation, messaging, or the like. For example, the first passenger and the second passenger may converse with one another (e.g., virtually via the in-flight shared virtual environment, in real-life before or during the flight) and discover some shared travel interest or objective through their conversation. Their mutual selection of the virtual experience application may result from their discovery of common travel interests/objectives.

The mobile platform thus operates the combined interactive session to provide a cooperative and collaborative virtual experience to the first and second passengers, to help fulfill their common travel interests or objectives. In some embodiments, the combined interactive session is operated or executed by an in-vehicle or onboard server of the mobile platform, and the virtual content of the application is provided to the first and second passengers via their personal electronic devices, via seatback display devices, via head-mounted display devices, and/or the like.

Figure 5C:
FIG. 5C illustrates examples of virtual experience activities provided to passengers onboard a commercial passenger vehicle.

FIG. 5C illustrates examples of virtual experience activities provided in-flight to passengers onboard a commercial passenger vehicle. As shown, the virtual experience activities are collaborative, and can be enjoyed collaboratively by multiple passengers. The passengers can be represented within the virtual experience activities via virtual avatars, which can preserve a desired level of anonymity between the passengers when interacting within the virtual experience activities. The virtual experiences activities relate to real-life experiences that can be enjoyed by the passengers at their destination. In the illustrated example, the virtual experience activities relate to wine tasting experiences, sight-seeing experiences, touring experiences, lodging/living or accommodation experiences, and the like.

Returning to FIG. 5B, at block 516, the mobile platform transmits, to an extra-vehicular system associated with the real-world experience, information capturing user inputs made by the first passenger and the second passenger during the combined interactive session, to pre-configure aspects of the real-world experience for the first passenger and the second passenger. In some embodiments, the mobile platform transmits the information whenever the mobile platform has a connection with a communication network, such as when the vehicle is nearing or at a destination. The user inputs made by the first and second passengers during the combined interaction session include inputs that controlled aspects of the virtual experience. For example, the first and second passengers may have made inputs that controlled their respective avatars to fly around or navigate a real-life feature or location. These inputs for a virtual experience can be communicated to the extra-vehicular system, for example, to assist the extra-vehicular system to determine whether the passengers are interested in the corresponding real-life experience. Based on analyzing the inputs made with respect to the virtual experience, recommendations for the real-life experience can be made to the passengers. On a larger scale, passenger activity or behavior (as indicated by user selections and inputs) for a virtual experience can be used to update and improve a corresponding real-life experience. For instance, if many passengers virtually tour a particular wing of a museum, the museum can determine, from this virtual activity, to extend a duration of exhibits featured in the particular wing.

The user inputs can also include explicit selections and inputs made to pre-configure or pre-arrange aspects of real-life experiences occurring at a destination or subsequent to the journey of the commercial passenger vehicle. For example, the virtual experience application may present a restaurant menu, hotel room options, ridesharing or transportation options for the first and second passengers to pre-select. Thus, explicit selections and inputs made by the first and second passenger to intentionally arrange and reserve real-life experiences at a destination can be communicated to extra-vehicular systems (e.g., a restaurant ordering system, a hotel management system, a ridesharing dispatch system) to fulfill the passengers' desires.

FIGS. 5D-5F illustrate examples of pre-configuring or arranging aspects of real-life destination experiences. In FIG. 5D, each passenger has selected a subset of activities offered by different providers. In the illustrated non-limiting example, a first passenger has made a selection that includes Activity 1 with Provider 2, Activity 2 with Provider 3, Activity 4 with Provider 4, Activity 6 with Provider 3, Activity 6 with Provider 1, and Activity 8 with Provider 2. Thus, as demonstrated, a passenger can pre-configure aspects of their journey and travel at their destination via a selection of real-life activities and/or providers. The selection can be at least two-dimensional, with one dimension identifying different activities and another dimension identifying different providers for the different activities. In some embodiments, a virtual experience application relates to a given real-life activity, and offers the opportunity to a passenger using the virtual experience application to select a provider to provide the real-life activity. In some embodiments, this two-dimensional selection can be at least partially generated based on a passenger's interaction with virtual experience applications in an in-flight virtual environment. For example, after some time spent in an in-flight virtual environment and interacting with virtual experience applications, a table such as that shown in FIG. 5D can be pre-populated and provided to a passenger for confirmation and/or modification.

FIGS. 5E and 5F illustrate example travel plans or itineraries that are generated based on passenger selections of real-life activities and providers. As illustrated, these travel plans can include start dates and end dates. In some embodiments, a travel plan can be automatically generated and optimized based on the user selections or pre-configurations demonstrated with FIG. 5D. Given a passenger's general itinerary information such as a journey start and end date, these selected real-life activities can be arranged and optimized within the journey start and end date. Further optimization can be provided by sequencing the real-life activities based on respective locations of the activities or the providers thereof. Various optimization models can be used to arrange multiple selected real-life activities within a passenger's travel window. For example, a route optimization or path finding module can determine an optimized sequence of selected real-life activities based on locations of the selected real-life activities. As a further example, optimization insights such as scheduling restaurant activities around meal times can be implemented via models such as rule-based models or machine learning models trained for scheduling activities.

Example Computing Systems

Figure 6:
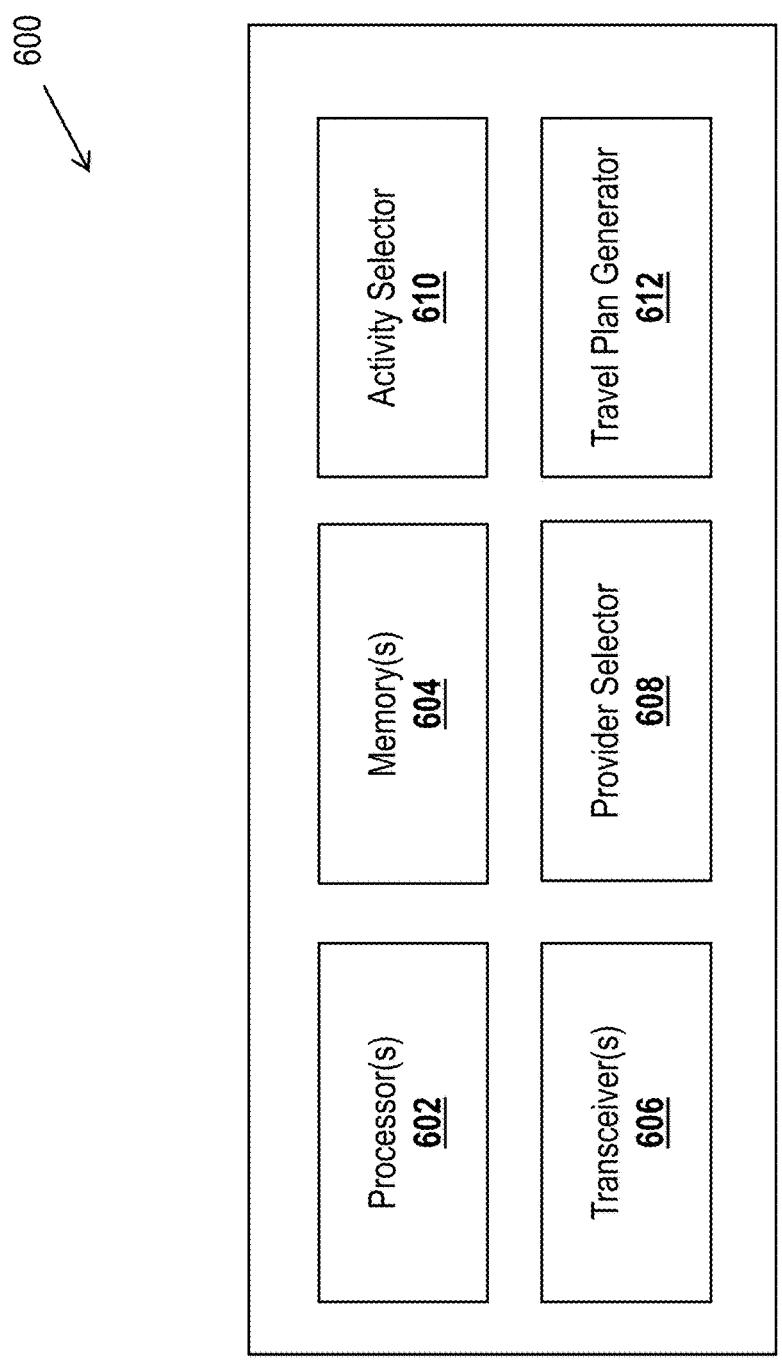
FIG. 6 is a block diagram of a computing system on which embodiments described herein may be implemented.

FIG. 6 illustrates an example of a computing system 600 that implements various embodiments disclosed herein. For example, the computing system 600 is embodied by a central computing system that performs the techniques described herein. The computing system 600 thus can perform examples techniques and operations disclosed herein relating to generating and providing an in-flight shared virtual environment configured to facilitate secure and/or anonymized interactions and communications between passengers onboard a commercial passenger vehicle.

In FIG. 6, the computing system 600 includes at least one processor 602 and a memory 604 having instructions stored thereupon. The memory 604 may store instructions to be executed by the processor 602. In other embodiments, additional, fewer, and/or different elements may be used to configure the computing system 600. The memory 604 is an electronic holding place or storage for information or instructions so that the information or instructions can be accessed by the processor 602. The memory 604 can include, but is not limited to, any type of random-access memory (RAM), any type of read-only memory (ROM), any type of flash memory, etc. Such as magnetic storage devices (e.g., hard disk, floppy disk, magnetic strips, etc.), optical disks (e.g., compact disk (CD), digital versatile discs (DVD), etc.), smart cards, flash memory devices, etc. The instructions upon execution by the processor 602 configure the computing system 600 to perform the example operations described in this patent document.

The instructions executed by the processor 602 may be carried out by a special purpose computer, logic circuits, or hardware circuits. The processor 602 may be implemented in hardware, firmware, software, or any combination thereof. The term "execution" is, for example, the process of running an application or the carrying out of the operation called for by an instruction. The instructions may be written using one or more programming language, scripting language, assembly language, etc. By executing the instruction, the processor 602 can perform the operations called for by that instruction. The processor 602 operably couples with the memory 604 and transceiver 606 to receive, to send, and to process information and to control the operations of the computing system 600. The processor 602 may retrieve a set of instructions from a permanent memory device such as a ROM device and copy the instructions in an executable form to a temporary memory device that is generally some form of RAM. In some implementations, the computing system 600 can include a plurality of processors that use the same or a different processing technology.

The transceiver 606 transmits and receives information or data to another device. The transceiver 606 can transmit and receive signals over different networks, including Wi-Fi networks, cellular networks, in-flight connectivity or edge networks, satellite networks, and/or the like. The transceiver 606 may be comprised of a transmitter and a receiver; in some embodiments, the computing system 600 comprises a transmitter and a receiver that are separate from another but functionally form a transceiver.

As illustrated, the computing system 600 further includes a provider selector 608, an activity selector 610, and a travel plan generator 612. In some embodiments, each of the provider selector 608, the activity selector 610, and the travel plan generator 612 is embodied by a combination of at least a portion of the processor 602 and the memory 604. In some embodiments, each of the provider selector 608, the activity selector 610, and the travel plan generator 612 includes a dedicated processor and a dedicated memory. For example, each of the provider selector 608, the activity selector 610, and the travel plan generator 612 is embodied by an application-specific integrated circuit (ASIC), a programmable logic device (PLD), and/or the like. In some embodiments, each of the provider selector 608, the activity selector 610, and the travel plan generator 612 is a computing device that is included in or connected to the computing system 600.

The provider selector 608 is configured to identify and select providers for each of a set of real-life activities. Providers that can be identified and selected by the provider selector 608 can include specific restaurants, breweries, wineries, hotels, parks, museums, and/or the like. In some embodiments, the provider selector 608 is configured to receive an indication of a set of real-life activities and identify, for each real-life activity, one or more providers that provide the real-life activity at a journey destination. Thus, in some examples, the provider selector 608 identifies providers specific to a journey destination for a specific passenger. In some embodiments, the provider selector 608 identifies the providers based on querying an API for a search platform, the API being configured to return results of providers based on a query of a type of activity or experience.

The activity selector 610 is configured to select virtual and/or real-life activities for a passenger. In some embodiments, the activity selector 610 is configured to receive user inputs that specify one or more real-life activities, identify virtual experience applications that correspond to the one or more real-life activities, and provide the indication of the virtual experience applications to a passenger.

The travel plan generator 612 is configured to generate a travel plan for a passenger based on the passenger's virtual behavior or interactions during a flight. For example, the travel plan generator 612 is configured to generate a travel plan or itinerary for the passenger that includes real-life activities that were simulated by the virtual experience applications enjoyed by the passenger during the flight. In some embodiments, the travel plan generator 612 is configured to monitor passenger activity within an in-flight virtual environment or with virtual experience applications in order to determine a set of real-life activities, determine one or more providers for each of the set of real-life activities (e.g., using the provider selector 608), and generate an itinerary that includes the set of real-life activities and the one or more providers for each of the set of real-life activities. In some embodiments, generating the itinerary includes optimizing the itinerary, for example, by arranging the set of real-life activities in an optimized sequence (e.g., based on location of each real-life activity). In some embodiments, the travel plan generator 612 uses a travel itinerary for a passenger (e.g., specifying departure and return dates) to generate an activity itinerary, such that the activities specified by the activity itinerary are scheduled in compliance with travel and accommodations already specified in the passenger's travel itinerary.

Example Technical Solutions

Some preferred embodiments of the present disclosure implement the following solutions.

1. A method implemented by a ground-server that is configured to communicatively couple with an in-flight entertainment server includes, receiving, by the ground server, indications of interest for onboard social media participation by multiple passengers on a flight, communicating the indications to the in-flight entertainment server such that the in-flight entertainment server hosts a social media interaction between the multiple passengers during the flight.

2. The method of solution 1, wherein the method is implemented according to a set of rules of privacy specified by an airline that manages the travel or by an operator of the ground server.

3. A computer-implemented method comprising: configuring an in-flight server to provide an interactive session to a first passenger and a second passenger traveling onboard a commercial passenger vehicle; and providing, during the interactive session, an interactive access to a virtual experience application to the first passenger and/or the second passenger.

4. The method of solution 3, further comprising: ending, at an end of travel, the interactive session according to a configuration specified by a priori rule or an input received from the first passenger or the second passenger.

5. The method of solution 3 or 4, wherein the virtual experience application comprises a gaming application, a travel application or a financial application.

6. A method comprising: subsequent to a commercial passenger vehicle beginning a journey, providing, by an in-vehicle server, a shared virtual environment to a first passenger and a second passenger onboard the commercial passenger vehicle, wherein the shared virtual environment includes a virtual experience application that simulates a real-world experience at a journey destination of the first passenger and/or the second passenger; operating, by the in-vehicle server, a combined interactive session of the virtual experience application within the shared virtual environment for both the first passenger and the second passenger; and transmitting, by the in-vehicle server to an extra-vehicular system associated with the real-world experience, information (e.g., log data) capturing user inputs made by the first passenger and the second passenger during the combined interactive session of the virtual experience application to configure (e.g., pre-configure, make a reservation, modify) aspects of the real-world experience for the first passenger and the second passenger.

7. The method of solution 6, wherein the shared virtual environment is provided via at least one of seatback display devices located in the commercial passenger vehicle or personal electronic devices operated by the first passenger and the second passenger (e.g., a virtual reality head-mounted display device that is communicably coupled with one of the seatback display devices located in the commercial passenger vehicle).

8. The method of any of solutions 6-7, wherein the information is transmitted prior to or at a time when the commercial passenger vehicle concludes the journey, or subsequent to the in-vehicle system establishing ground communication with a ground server.

9. The method of any of solutions 6-8, wherein the virtual experience application is configured to enable the first passenger and the second passenger to select, via the user inputs, a good or service provided by a vendor located at the journey destination, and wherein transmitting the information capturing user inputs includes transmitting a selection of the good or service by the first passenger and the second passenger to be fulfilled by the vendor when the first passenger and the second passenger arrive at the journey destination.

10. The method of any of solutions 6-9, further comprising: indicating, to each of the first passenger and the second passenger, the virtual experience application out of a plurality of virtual experience applications based on parsing communications between the first passenger and the second passenger within the shared virtual environment.

11. The method of any of solutions 6-10, further comprising: selecting the virtual experience application from a plurality of virtual experiences based on identifying digital profiles for the first passenger and the second passenger associated with the extra-vehicular system.

12. The method of any of solutions 6-11, wherein transmitting the information capturing user inputs comprises uploading the information to a ledger database (e.g., a blockchain) that is accessible by the extra-vehicular system.

13. The method of any of solutions 6-12, further comprising: receiving, from both the first passenger and the second passenger, a selection of the virtual experience from a plurality of virtual experiences prior to the commercial passenger vehicle departing on the journey.

14. The method of any of solutions 6-13, wherein the information capturing user inputs comprises a selection of at least one of: a menu item for a restaurant at a destination of the journey, a living accommodation at the destination, or a travel excursion or experience at the destination.

15. The method of any of solutions 6-14, wherein the virtual experience application is configured to provide an extended reality (XR) experience with a landmark near which the journey of the commercial passenger vehicle passes, and wherein the combined interactive session of the virtual experience application is operated in response to the commercial passenger vehicle being located within a predetermined range from the landmark.

16. The method of any of solutions 6-15, wherein operating the combined interactive session of the virtual experience application comprises using virtual avatars associated with the first passenger and the second passenger to represent the first passenger and the second passenger within the combined interactive session.

17. The method of any of solutions 6-16, wherein information capturing user inputs made by the first passenger and the second passenger comprises respective travel plans for each of the first passenger and the second passenger, the respective travel plans indicating at least the real-world experience and a corresponding experience provider for the real-world experience.

18. The method of any of solutions 6-17, further comprising: generating an optimized travel plan for the first passenger that includes one or more selected real-world experiences and a provider for each of the one or more selected real-world experiences, wherein the travel plan is generated based on one or more virtual experience applications with which the first passenger interacts.

19. The method of any of solutions 6-18, further comprising: further providing at least one virtual experience application of the in-flight shared virtual environment during at least one of an origin stage prior to the journey of the commercial passenger vehicle or a destination stage subsequent to the journey of the commercial passenger vehicle.

20. The method of any of solutions 6-19, further comprising: causing the virtual experience application to be provided during an origin stage of at least one the first passenger or the second passenger; and continuing to operate the combined interactive session of the virtual experience application for the first passenger or the second passenger at a destination subsequent to the journey of the commercial passenger vehicle.

21. A computing system comprising at least one processor and at least one memory storing instructions that, when executed by the at least one processor, cause the computing system to perform the method of any of solutions 1-20.

22. A non-transitory computer-readable medium storing instructions that, when executed by a processor, cause the processor to perform the method of any of solutions 1-20.

The above description and drawings are illustrative and are not to be construed as limiting. Numerous specific details are described to provide a thorough understanding of the disclosure. However, in certain instances, well-known details are not described in order to avoid obscuring the description. Further, various modifications may be made without deviating from the scope of the embodiments.

As used herein, unless specifically stated otherwise, terms such as "processing," "computing," "calculating," "determining," "displaying," "generating," or the like, refer to actions and processes of a computer or similar electronic computing device that manipulates and transforms data represented as physical (electronic) quantities within the computer's memory or registers into other data similarly represented as physical quantities within the computer's memory, registers, or other such storage medium, transmission, or display devices.

Reference herein to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

The terms used in this specification generally have their ordinary meanings in the art, within the context of the disclosure, and in the specific context where each term is used. Certain terms that are used to describe the disclosure are discussed above, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that the same thing can be said in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any term discussed herein is illustrative only and is not intended to further limit the scope and meaning of the disclosure or of any exemplified term. Likewise, the disclosure is not limited to various embodiments given in this specification.

Without intent to further limit the scope of the disclosure, examples of instruments, apparatus, methods and their related results according to the embodiments of the present disclosure are given above. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

From the foregoing, it will be appreciated that specific embodiments of the invention have been described herein for purposes of illustration, but that various modifications may be made without deviating from the scope of the invention. Accordingly, the invention is not limited except as by the appended claims.

From the foregoing, it will be appreciated that specific embodiments of the invention have been described herein for purposes of illustration, but that various modifications may be made without deviating from the scope of the invention. Accordingly, the invention is not limited except as by the appended claims.

The invention claimed is:

1. An in-flight entertainment and communication (IFEC) system comprising:
    at least one processor; and
    at least one memory storing instructions that, when executed by the at least one processor, cause the IFEC system to:
        provide, during a journey of a commercial passenger vehicle, a shared virtual environment to a first passenger and a second passenger onboard the commercial passenger vehicle via at least one of personal electronic devices operated by the first passenger and the second passenger or seatback display devices located in the commercial passenger vehicle, wherein the shared virtual environment includes a virtual experience application that simulates a real-world experience at a journey destination of the first passenger or the second passenger;
        operate a combined interactive session of the virtual experience application within the shared virtual environment for both the first passenger and the second passenger; and
        prior to or at a time when the commercial passenger vehicle concludes the journey, transmit, to an extra-vehicular system outside of the commercial passenger vehicle and associated with the real-world experience, information capturing user inputs made by the first passenger and the second passenger during the combined interactive session of the virtual experience application to configure aspects of the real-world experience for the first passenger and the second passenger.

2. The IFEC system of claim 1, wherein the virtual experience application is configured to enable the first passenger and the second passenger to select, via the user inputs, a good or service provided by a vendor located at the journey destination, and wherein transmitting the information capturing user inputs includes transmitting a selection of the good or service by the first passenger and the second passenger to be fulfilled by the vendor when the first passenger and the second passenger arrive at the journey destination.

3. The IFEC system of claim 1, wherein the instructions further cause the IFEC system to:
    indicate, to each of the first passenger and the second passenger, the virtual experience application out of a plurality of virtual experience applications based on parsing communications between the first passenger and the second passenger within the shared virtual environment.

4. The IFEC system of claim 1, wherein the instructions further cause the IFEC system to:
    select the virtual experience application from a plurality of virtual experiences based on identifying digital profiles for the first passenger and the second passenger associated with the extra-vehicular system.

5. The IFEC system of claim 1, wherein transmitting the information capturing user inputs comprises uploading the information to a ledger database that is accessible by the extra-vehicular system.

6. The IFEC system of claim 1, wherein the instructions further cause the IFEC system to:
    receive, from both the first passenger and the second passenger, a selection of the virtual experience from a plurality of virtual experiences prior to the commercial passenger vehicle departing on the journey.

7. The IFEC system of claim 1, wherein the personal electronic devices operated by the passengers include a virtual reality head-mounted display device that is communicably coupled with one of the seatback display devices located in the commercial passenger vehicle.

8. A method comprising:
    providing, during a journey of a commercial passenger vehicle, an in-flight shared virtual environment to a first passenger and a second passenger onboard the commercial passenger vehicle, wherein the in-flight shared virtual environment comprises a virtual experience application that simulates a real-world experience related to the journey;
    operating a combined interactive session of the virtual experience application within the in-flight shared virtual environment for both the first passenger and the second passenger; and
    transmitting, to an extra-vehicular system that is outside the commercial passenger vehicle, information capturing user inputs made by the first passenger and the second passenger during the combined interactive session to pre-configure aspects of the real-world experience for the first passenger and the second passenger.

9. The method of claim 8, wherein the information capturing user inputs comprises a selection of at least one of: a menu item for a restaurant at a destination of the journey, a living accommodation at the destination, or a travel excursion or experience at the destination.

10. The method of claim 8, wherein the virtual experience application is configured to provide an extended reality (XR) experience with a landmark near which the journey of the commercial passenger vehicle passes, and wherein the combined interactive session of the virtual experience application is operated in response to the commercial passenger vehicle being located within a predetermined range from the landmark.

11. The method of claim 8, further comprising:
    selecting the virtual experience application from a plurality of virtual experience applications based on parsing communications between the first passenger and the second passenger within the in-flight shared virtual environment.

12. The method of claim 8, further comprising:
    further providing at least one virtual experience application of the in-flight shared virtual environment during at least one of an origin stage prior to the journey of the commercial passenger vehicle or a destination stage subsequent to the journey of the commercial passenger vehicle.

13. The method of claim 8, wherein transmitting the information capturing user inputs comprises uploading the information to a ledger database that is accessible by the extra-vehicular system.

14. The method of claim 8, wherein operating the combined interactive session of the virtual experience application comprises using virtual avatars associated with the first passenger and the second passenger to represent the first passenger and the second passenger within the combined interactive session.

15. The method of claim 8, wherein information capturing user inputs made by the first passenger and the second passenger comprises respective travel plans for each of the first passenger and the second passenger, the respective travel plans indicating at least the real-world experience and a corresponding experience provider for the real-world experience.

16. The method of claim 8, further comprising:
generating an optimized travel plan for the first passenger that includes one or more selected real-world experiences and a provider for each of the one or more selected real-world experiences, wherein the travel plan is generated based on one or more virtual experience applications with which the first passenger interacts.

17. A non-transitory computer-readable storage medium storing instructions that, when executed by at least one processor of an in-vehicle system, cause the in-vehicle system to implement a method comprising:
providing, during a journey of a commercial passenger vehicle, an in-flight shared virtual environment to a first passenger and a second passenger onboard the commercial passenger vehicle, wherein the in-flight shared virtual environment comprises a virtual experience application that simulates a real-world experience related to the journey;
operating a combined interactive session of the virtual experience application within the in-flight shared virtual environment for both the first passenger and the second passenger via at least one of personal electronic devices operated by the first passenger and the second passenger or seatback display devices located onboard the commercial passenger vehicle; and
transmitting, to an extra-vehicular system outside of the commercial passenger vehicle and associated with the real-world experience, log data capturing user activity by the first passenger and the second passenger during the combined interactive session of the virtual experience application to pre-configure aspects of the real-world experience for the first passenger and the second passenger.

18. The non-transitory computer-readable storage medium of claim 17, wherein the log data comprises a selection of at least one of: a menu item for a restaurant at a destination of the journey, a living accommodation at the destination, or a travel excursion or experience at the destination.

19. The non-transitory computer-readable storage medium of claim 17, wherein the method implemented by the in-vehicle system further comprises:
selecting the virtual experience application from a plurality of virtual experience applications based on parsing communications between the first passenger and the second passenger within the in-flight shared virtual environment.

20. The non-transitory computer-readable storage medium of claim 17, wherein the method implemented by the in-vehicle system further comprises:
causing the virtual experience application to be provided during an origin stage of at least one the first passenger or the second passenger; and
continuing to operate the combined interactive session of the virtual experience application for the first passenger or the second passenger at a destination subsequent to the journey of the commercial passenger vehicle.

* * * * *